United States Patent
Numata

(10) Patent No.: US 7,784,510 B2
(45) Date of Patent: Aug. 31, 2010

(54) HEAVY DUTY TIRE HAVING CAP AND BASE RUBBER LAYERS, BELT CUSHION RUBBER AND SIDEWALL RUBBER

(75) Inventor: Kazuki Numata, Kobe (JP)

(73) Assignee: Sumitomo Rubber Industries, Ltd., Kobe-shi, Hyogo-Ken (JP)

( * ) Notice: Subject to any disclaimer, the term of this patent is extended or adjusted under 35 U.S.C. 154(b) by 972 days.

(21) Appl. No.: 11/517,286

(22) Filed: Sep. 8, 2006

(65) Prior Publication Data

US 2007/0084533 A1 Apr. 19, 2007

(30) Foreign Application Priority Data

Oct. 17, 2005 (JP) .............................. 2005-301988

(51) Int. Cl.
*B60C 1/00* (2006.01)
*B60C 11/00* (2006.01)
(52) U.S. Cl. .................... 152/209.5; 152/525; 152/532; 152/538
(58) Field of Classification Search ............. 152/209.5, 152/525, 532, 538
See application file for complete search history.

(56) References Cited

U.S. PATENT DOCUMENTS

| | | | |
|---|---|---|---|
| 3,759,306 A | * | 9/1973 | Greiner et al. ........... 152/209.5 |
| 4,739,811 A | * | 4/1988 | Rampl ..................... 152/209.5 |
| 5,131,446 A | * | 7/1992 | Fukumoto et al. ........... 152/538 |
| 6,247,512 B1 | * | 6/2001 | Radulescu ............... 152/209.5 |
| 6,880,599 B2 | * | 4/2005 | Maruoka et al. ............ 152/538 |
| 2006/0225825 A1 | * | 10/2006 | Kotanides .................... 152/538 |

FOREIGN PATENT DOCUMENTS

| | | | |
|---|---|---|---|
| EP | 435620 | * | 7/1991 |
| JP | 06-048115 | * | 2/1994 |
| JP | 06-157829 | * | 6/1994 |
| JP | 2003-127613 | * | 5/2003 |
| JP | 2005-035404 | * | 2/2005 |
| JP | 2005-35404 A | | 2/2005 |
| WO | 2006/066602 | * | 6/2006 |

OTHER PUBLICATIONS machine translation for Japan 2005-035404 (no date).*

* cited by examiner

*Primary Examiner*—Steven D Maki
(74) *Attorney, Agent, or Firm*—Birch, Stewart, Kolasch & Birch, LLP

(57) ABSTRACT

A heavy duty tire having both an excellent wear resistance and a low rolling resistance and comprising a tread rubber having a two layer structure composed of a cap rubber layer 2Gb and a base rubber layer 2Ga underlying the cap layer, wherein the tread rubber extends axially outward from the tire equator and is bent at its edges to extend radially downward so that the cap layer is located axially outward of the base layer, and a pair of sidewall rubbers are disposed so that the radially outer end portion of each sidewall rubber covers the surface of the axially outer end of the tread rubber.

4 Claims, 2 Drawing Sheets

HEAVY DUTY TIRE HAVING CAP AND BASE RUBBER LAYERS, BELT CUSHION RUBBER AND SIDEWALL RUBBER

BACKGROUND OF THE INVENTION

The present invention relates to a heavy duty tire having good rolling characteristics improved without lowering the wear resistance, more particularly to a heavy duty tire having a double layer tread composed of a cap rubber layer and a base rubber layer.

In heavy duty tires used for trucks and buses, in order to achieve both excellent wear resistance and low rolling resistance, it is known to form the tread thereof into a double layer structure composed of a cap rubber layer providing the outer surface of the tread and a base rubber layer disposed radially inward of the cap rubber layer, wherein a rubber having an excellent wear resistance is used in the cap rubber layer and a low heat-generating rubber having a low loss tangent is used in the base rubber layer. A tread having a three layer structure is also known as disclosed, for example, in JP 2005-35404 A.

From the viewpoint of low fuel cost, recently, further improvement in low rolling resistance is strongly demanded. However, even if the thickness of the cap rubber layer is simply decreased to increase the proportion of the low heat-generating base rubber, there arises a problem that the wear resistance is deteriorated. Therefore, it is difficult to simultaneously achieve high levels of wear resistance and rolling characteristics in tires including a double layered tread.

It is an object of the present invention to provide a heavy duty tire having both an improved low rolling resistance and an excellent wear resistance.

This and other objects of the present invention will become apparent from the description hereinafter.

SUMMARY OF THE INVENTION

It has now been found that the rolling resistance of tires having a double layered tread can be improved without lowering the wear resistance of the tread by regulating the distribution of thickness of the base rubber layer in the tread.

In accordance with the present invention, there is provided a heavy duty tire comprising a carcass which extends from a tread portion to each of bead cores of bead portions through sidewall portions, and a belt layer which comprises a plurality of belt plies including a belt ply having the maximum width and which is disposed radially outward of the carcass in a tread portion, wherein a tread rubber disposed in the tread portion comprises a cap rubber layer which provides the outer surface of the tread portion, and a base rubber layer disposed radially inward of the cap rubber layer, and each of the axially outer ends of the tread rubber terminates radially inward beyond a lateral base line extending in the axial direction of the tire from an axially outer end of the belt ply having the maximum width, a sidewall rubber disposed in each of the sidewall portions has a radially outer end extending radially outward beyond the lateral base line to cover the axially outer end of the tread rubber, on the lateral base line, the La/Lt ratio of a thickness La of the base rubber layer to a distance Lt from the axially outer end of the belt ply having the maximum width to the outer surface of the tire is from 0.6 to 0.8, the Lb/Lt ratio of a thickness Lb of the cap rubber layer to the distance Lt is from 0.1 to 0.3, and the Ls/Lt ratio of a thickness Ls of the sidewall rubber to the distance Lt is from 0.1 to 0.2, on a normal line extending from the axially outer end of the belt ply having the maximum width to the tread outer surface, the Ta/Tt ratio of a thickness Ta of the base rubber layer to a distance Tt from the axially outer end of the belt ply having the maximum width to the tread outer surface is from 0.35 to 0.45, and the Cb/Tb ratio of a thickness Cb of the cap rubber layer in a tread center region, the center line of which is the equator of the tire and which has a width of 50% of the tread width, to a thickness Tb of the cap rubber layer on the normal line is more than 1.0 and less than 1.6.

In the specification, the "dimensions" of respective parts or portions of the tire denotes those measured in the standard state that the tire is mounted on a standard rim and inflated to 50 kPa, unless otherwise noted. The term "standard rim" denotes a rim defined for every tire in a standardizing system on which the tire is based and, for example, is called "standard rim" in JATMA, "design rim" in TRA and "measuring rim" in ETRTO.

Further, the term "loss tangent" as used herein denotes a value measured using a viscoelastic spectrometer at a temperature of 70° C., a frequency of 10 Hz, an initial strain of 10% and a dynamic strain of ±1%.

The term "hardness" or "rubber hardness" as used herein denotes a durometer type A hardness (shore A hardness) measured at 23° C.

In the present invention, a double layered tread band comprising a cap layer and a base layer is disposed so as to increase the proportion of the low heat-generating base rubber layer in the shoulder portion where the heat generation, i.e., energy loss, is the largest in the tread portion, while optimizing the proportions of rubbers such as cap rubber, base rubber and sidewall rubber in the shoulder portion. By such an arrangement, the rolling resistance can be effectively decreased without deteriorating other properties such as durability and cracking resistance.

On the other hand, the cap layer is formed so that its thickness Cb in the center region of the tread is larger than the thickness Tb in the shoulder region of the tread. That is to say, since the proportion of the cap layer is increased in the tread center region where the ground-contacting pressure is large and accordingly the influence on wear life is large, an excellent wear resistance is secured. Moreover, since in the tread center region the rigidity is increased as a result of the increase in the proportion of the cap layer, the movement of the tread is restricted and, therefore, the increase in energy loss owing to the decrease in the proportion of the base layer in the tread center region can be controlled low. Thus, synthetically the rolling characteristics can be improved to simultaneously achieve high levels of rolling characteristics and wear resistance.

DETAILED DESCRIPTION OF THE INVENTION

An embodiment of the present invention will now be explained with reference to the accompanying drawings.

Figure 1:
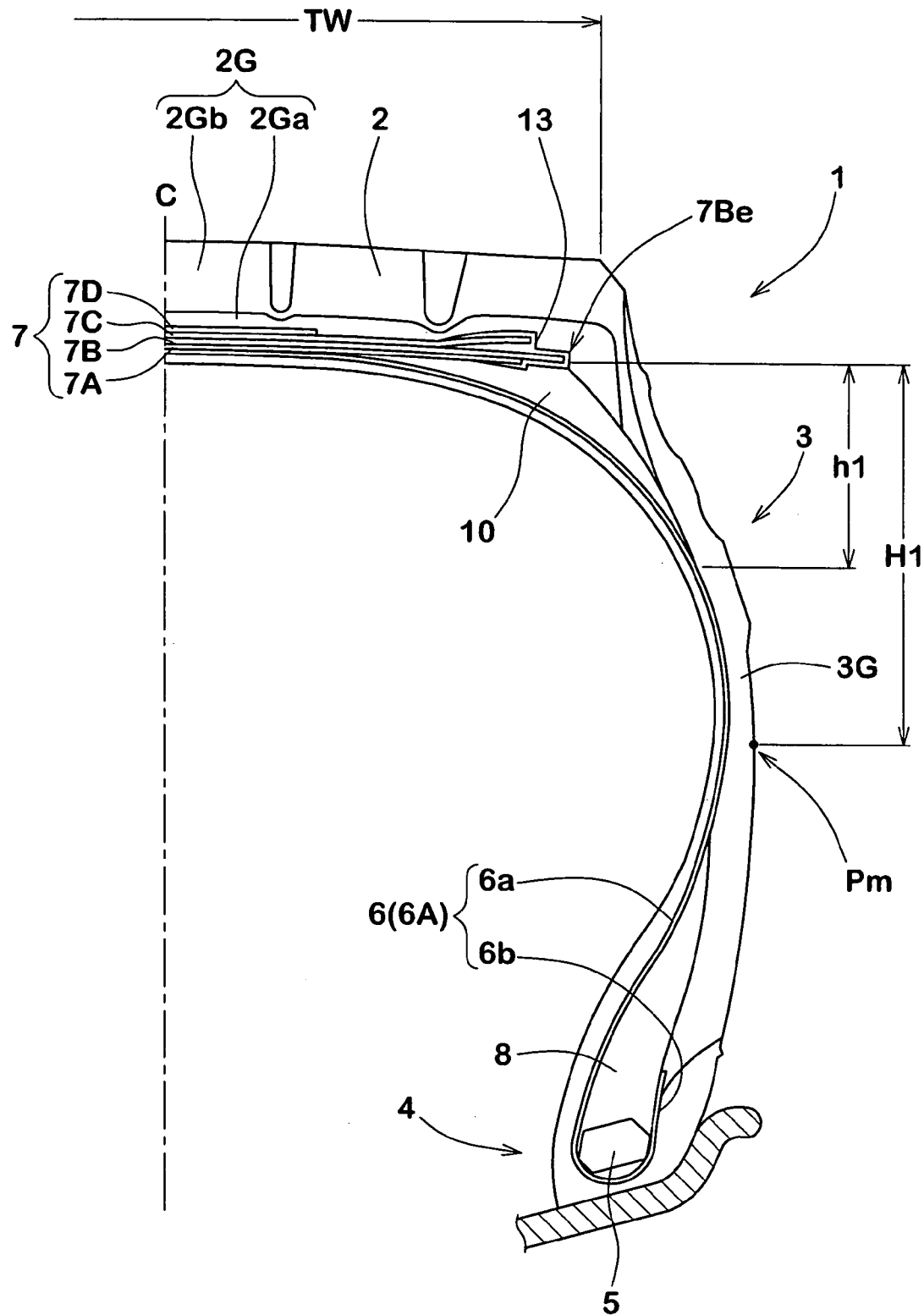
FIG. 1 is a cross sectional view of a heavy duty tire illustrating an embodiment of the present invention.

FIG. 1 is a cross sectional view illustrating a normal condition of a heavy duty tire according to the present invention inflated to an inner pressure of 50 kPa. In FIG. 1, heavy duty tire 1 includes, at the least, a carcass 6 that extends from a tread portion 2 to each of bead cores 5 in opposing bead portions 4 through sidewall portions 3, and a belt layer 7 that is disposed radially outward of the carcass 6 in the tread portion 2.

The carcass 6 comprises at least one carcass ply 6A (in this embodiment, one carcass ply) in which carcass cords are disposed at an angle of, for instance, 80 to 90° with respect to the tire equator C. Steel cords are suitably used as a carcass cord, but organic fiber cords such as nylon, rayon, polyester, aromatic polyamide and other known organic fiber cords may also be used as occasion demands. The carcass ply 6A is composed of a toroidal main body portion 6a that extends from one bead core 5 to the opposing bead core 5, passing through the crown region of the tire, and turnup portions 6b that extend from the both ends of the main body portion 6a and are turned up around the bead cores 5 from the axially inside to the axially outside of the tire to thereby anchor the carcass ply.

In this embodiment, bead apex rubber 8 is disposed radially outward of each bead core 5 and between main body portion 6a and turnup portion 6b of the carcass ply to extend from the bead core 5 toward the radially outward of the tire in a tapered manner, thereby reinforcing a region extending over the bead portion 4 and the sidewall portion 3. A wind bead structure may be adopted, wherein the turnup portion 6b is wound around the bead core 5 to sandwich its end portion between the bead core 5 and the bead apex rubber 8.

The belt layer 7 comprises at least two plies, usually three or is four plies, of steel cords. The tire 1 according to the embodiment shown in FIG. 1 includes a belt layer 7 composed of four belt plies wherein disposed on the radially innermost side is a first belt ply 7A of belt cords arranged at an angle of, for instance, 60±15° with respect to the tire circumferential direction, and subsequently disposed radially outward of the first ply are second to fourth belt plies 7B, 7C and 7D of belt cords arranged at an angle of, for instance, 10 to 35° with respect to the tire circumferential direction.

Among belt plies 7A to 7D, the second belt ply 7B has the maximum width. For example, the width of the second belt ply 7B is from 0.80 to 0.95 time the tread width TW, and the width of the first and third belt plies 7A and 7C is from 85 to 95% of the maximum width of the belt ply, namely the width of the second belt ply 7B. By such an arrangement, an approximately full width of the tread portion 2 is reinforced by a hoop effect, and stress concentration occurring at the axially outer ends of respective belt plies is eased. The axially outer ends or end portions of at least the second belt ply 7A (in this embodiment, the first to third belt plies 7A to 7C) may be protected by covering in a U-shape with a thin covering rubber 13 in order to prevent damage starting from the belt cord ends. Preferably the hardness of the covering rubber 13 is from 60 to 70. The thickness of the covering rubber 13 is from 0.1 to 1.5 mm, preferably 0.3 to 0.6 mm. In the embodiment shown in the drawings, the radially outermost belt ply 7D is located within the tread center region Yc.

The belt layer 7 is disposed so that the both end portions thereof are gradually separated from the carcass ply 6, and in the space formed between the carcass 6 and each of the gradually separating portions of the belt layer 7 is disposed a belt cushion rubber 10 having an approximately triangular cross section. The belt cushion rubber 10 has the maximum thickness at a location corresponding to each axially outer end 7Be of the second belt ply 7B, and from that location, extends along the radially outer surface of the carcass 6 with gradually decreasing its thickness. The radial distance h1 from the radially inner surface of the second belt ply 7B at the location of the axially outer end 7Be to the radially inner end of the belt cushion rubber 10 (radial height between the belt ply outer end 7Be and the radially inner end of the cushion rubber 10) is from ⅓ to ¾ time the radial distance H1 from the radially inner surface of the belt ply 7B at the location of the outer end 7Be to a location Pm where the tire width reaches the maximum. A rubber having a hardness of 60 to 70 is preferably used for the cushion rubber 10. By the arrangement of such a cushion rubber 10, the hoop effect of the belt layer 7 is exhibited while easing the shearing force between the belt cords and the carcass cords and, moreover, the tread shape is retained. Further, since the cushion rubber 10 extends radially inward and axially outward of the tire along the radially outer surface of the carcass 6 from the location corresponding to the axially outer end 7Be of the second belt ply 7B having the maximum width, the axially outer end of the radially innermost belt ply 7A from which structural damage is apt to start is protected by the cushion rubber 10.

Figure 2:
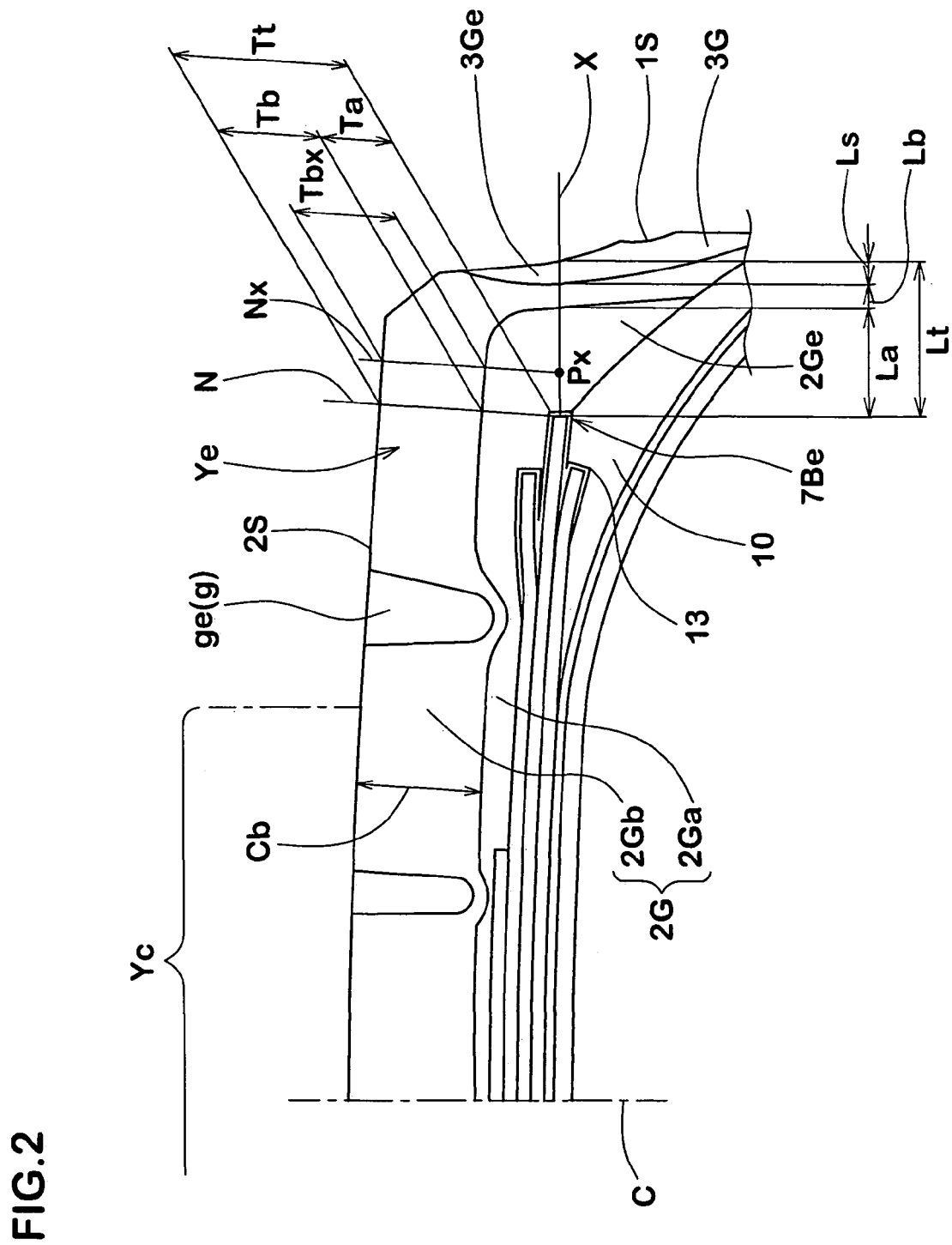
FIG. 2 is a partial cross sectional view illustrating a tread portion in an enlarged form of the tire shown in FIG. 1.

A tread rubber 2G is disposed radially outward of the belt layer 7. The tread rubber 2G has, as shown in FIG. 2, a two layer structure comprising a cap rubber layer 2Gb which provides a ground-contacting tread outer surface 2S, and a base rubber layer 2Ga disposed radially inward of the cap layer 2Gb. The axially outer end portions 2Ge of the tread rubber 2G extends radially inward beyond an imaginary lateral base line X drawn in the tire axial direction from each of the axially outer ends 7Be of the widest belt ply 7B, and terminate in contact with the belt cushion rubber 10. In other words, the tread rubber (tread band) extends axially outward from the tire equator C and is bent radially inward at an angle of approximately 90° at a location corresponding to each of the radially outer ends 7Be of the widest belt ply 7B to extend radially downward to the outer surface of the belt cushion rubber 10 so that the cap layer 2Gb is located axially outward of the base layer 2Ga. The terminal end of the radially downwardly extending portion of the tread rubber is located radially inward of the lateral base line X and radially outward of the radially inner end of the belt cushion rubber 10. In the cross section of the tire including the tire axis, the radially outer surface of the base rubber layer 2Ga in the shoulder portion is approximately parallel to the tread surface 2S, and the axially outer surface of the base rubber layer 2Ga in the radially downwardly extending portion of the tread rubber is approximately parallel to the tire equator plane or is slightly inclined radially outward with respect to the tire equator plane. The corner at which the axially outwardly extending outer surface and the radially downwardly extending outer surface of the base rubber layer 2Ga intersect is round as shown in FIG. 2. In the embodiment shown in FIG. 2, each of corners at which the tread surface 2S and the tire outer surface intersect is removed to form a slanting face which is inclined, for instance, at an angle of about 45°.

A pair of sidewall rubbers 3G are disposed axially outward of the carcass 6 in each sidewall portion 3 so that a radially outer end portion 3Ge of each sidewall rubber covers the axially outer end 2Ge of the tread rubber 2G, in other words, the axially outer surface of the cap rubber layer 2Gb in the bent portion of the tread rubber, and terminates radially above the lateral base line X, preferably at a location radially above the axially extending radially outer surface of the base rubber layer 2Ga in the shoulder portion.

In the cap rubber layer 2Gb is preferably used, from the viewpoint of wear resistance, a high resilient rubber having an excellent wear resistance that network intermolecular bonding has been enhanced to raise the rubber hardness (Hsb) to 64 to 68. The wet grip characteristics are also important for the cap rubber layer 2Gb. Therefore, it is also preferable that the rubber used in the cap rubber layer 2Gb has a high hysteresis friction, i.e., a high loss tangent (tan δb) within the range of 0.070 to 0.090.

In contrast, from the viewpoint of decreasing the rolling resistance, a low heat generating rubber having a loss tangent (tan δa) of 0.035 to 0.055 is preferably used in the base rubber layer 2Ga since the energy loss is small. The rubber hardness (Hsa) of the base rubber layer 2Ga is lower than the rubber hardness (Hsb) of the cap rubber layer 2Gb. From the viewpoint of obtaining a necessary steering stability, it is preferable to use a rubber having a hardness of 62 to 66 in the base rubber layer 2Ga.

If the hardness Hsb of the cap rubber layer 2Gb is less than the above-mentioned range, the wear resistance is deteriorated, and if the hardness Hsb is more than the above-mentioned range, the enveloping effect is decreased to deteriorate the ride comfort. If the loss tangent (tan δb) of the cap rubber layer 2Gb is less than the above-mentioned range, the wet grip characteristics are insufficient, and if it is more than the above-mentioned range, the rolling characteristics are impaired. Further, with respect to the base rubber layer 2Ga, if the loss tangent (tan δa) is less than 0.035, it is difficult to secure a sufficient rubber strength, and if the loss tangent (tan δa) is more than 0.055, a sufficient effect of enhancing the rolling characteristics is not obtained. If the hardness Hsa of the base rubber layer 2Ga is less than 62, the steering stability is deteriorated, and if the hardness Hsa is more than 66, it will be difficult to lower the loss tangent (tan δa) to fall within the above-mentioned range.

In the sidewall rubber 3G is preferably used a low resilient rubber, e.g., a rubber having a hardness Hss which is further decreased to a range of 52 to 56 as compared with the hardness Hsa of the base rubber layer 2Ga, so that the sidewall portion can flexibly bend in response to tire deformation to thereby control generation of cracks in the outer surface of the tire. If the hardness Hss is less than the above range, the cut resistance is insufficient, and if the hardness Hss is more than the above range, the cracking resistance is not sufficiently exhibited. The loss tangent (tan δs) of the sidewall rubber 3G is not particularly limited, but it is preferable to select from a range of 0.045 to 0.090 in order to obtain good cut resistance and cracking resistance.

In the present invention, in order to simultaneously achieve both an excellent wear resistance and a low rolling resistance, the proportion of the base layer 2Ga comprising a low heat-generating rubber is increased in the shoulder portion Ye where the heat generation, i.e., energy loss, is the largest in the tread portion 2, while optimizing the proportions of rubbers 2Ga, 2Gb and 3G. On the other hand, the proportion of the cap layer 2Gb is increased in the tread center region Yc where the ground-contacting pressure is large and accordingly the influence on wear life is large, thereby securing an excellent wear resistance. Moreover, since in the tread center region Yc the rigidity increases as a result of the increase in the proportion of the cap layer 2Gb, the movement of the tread is restricted and, therefore, increase of energy loss owing to the decrease in the proportion of the base layer 2Ga in the tread center region Yc can be controlled low. Thus, synthetically, the rolling resistance can be decreased to simultaneously achieve high levels of rolling characteristics and wear resistance.

For this purpose, in the present invention, the tread rubber 2G comprising the base layer 2Ga and the cap layer 2Gb and the sidewall rubber 3G are formed to satisfy the following conditions.

(1) On the lateral base line X;
(1-1) the La/Lt ratio is from 0.6 to 0.8, wherein "La" is a thickness of the base rubber layer 2Ga and "Lt" is a distance from the axially outer end 7Be of a belt ply 7B having the maximum width to the outer surface 1S of the tire (so-called buttress face 1S),
(1-2) the Lb/Lt ratio is from 0.1 to 0.3, wherein "Lb" is a thickness of the cap rubber layer 2Gb and "Lt" is as defined above, and
(1-3) the Ls/Lt ratio is from 0.1 to 0.2, wherein "Ls" is a thickness of the sidewall rubber 3G and "Lt" is as defined above.
(2) On a normal line N drawn from the axially outer end 7Be of the belt ply 7B having the maximum width to the tread outer surface 2S;
(2-1) the Ta/Tt ratio is from 0.35 to 0.45, wherein "Ta" is a thickness of the base rubber layer 2Ga and "Tt" is a distance from the axially outer end 7Be of the belt ply 7B having the maximum width to the tread outer surface 2S.
(3) The Cb/Tb ratio is from more than 1.0 to less than 1.6, wherein "Cb" is a thickness of the cap rubber layer 2Gb in the tread center region Yc which is a region straddling the tire equator C as its center line and having a width of 50% of the tread width TW, and "Tb" is a thickness of the cap rubber layer 2Gb on the normal line N.

The tread portion 2 is provided with grooves "g" in various tread patterns. Under the grooves, the thickness of the cap rubber layer 2Gb partially varies by an influence exerted at the time of forming the grooves "g". Thus, the "thickness Cb" denotes a thickness of the cap rubber layer 2Gb measured in the tread center region Yc at a location which is not influenced by the grooves "g". In case that the thickness of the cap rubber layer 2Gb varies in spite of a location which is not influenced by the grooves "g", the average value of the maximum thickness and the minimum thickness of the cap rubber layer in the tread center region Yc is adopted as the thickness Cb.

The "shoulder portion Ye" denotes a land portion (shoulder land portion) located axially outward of an axially outermost circumferential main groove "ge".

The "lateral base line X" denotes a straight line extending in the axial direction of the tire from the center of the thickness of the axially outer end 7Be.

By satisfying the above conditions (1-1) to (1-3), the proportion of the base rubber layer 2Ga in the tread portion is greatly increased, while optimizing the thickness of each of the rubbers 2Ga, 2Gb and 3G, in the shoulder portion Ye, particularly in a region located axially outward of the belt end. If the La/Lt ratio is less than 0.6, the proportion of the base rubber layer 2Ga is small, so the rolling resistance cannot be sufficiently decreased. The cap rubber layer 2Gb has a high rubber hardness and, therefore, has an effect of reinforcing the shoulder portion Ye. Therefore, if the Lb/Lt ratio is less than 0.1, this reinforcing effect is not exhibited, so the durability is decreased. The sidewall rubber 3G serves as a protective layer. Therefore, if the Ls/Lt ratio is less than 0.1, cracking damage is easy to occur at the buttress face 1S (side face 1S of the tire). If the Lb/Lt ratio is more than 0.3 and the Ls/Lt ratio is more than 0.2, the rolling characteristics are not sufficiently improved and, further, a balance of the rolling characteristics with the durability and the cracking resistance is impaired.

By satisfying the above condition (2-1), the effect of improving the rolling characteristics can be ensured while maintaining a balance with the durability and the cracking resistance. If the Ta/Tt ratio is less than 0.35, the rolling characteristics are not sufficiently improved, and if the ratio is more than 0.45, the wear resistance is deteriorated.

Further, by satisfying the above condition (3), the wear resistance can be improved, while further improving the rolling characteristics by adequately raising the rigidity of the tread center region Yc. If the Cb/Tb ratio is less than 1.0, the wear resistance cannot be improved, and if the ratio is more than 1.6, the rolling characteristics are impaired. From such points of view, preferably the Cb/Tb ratio is 1.1 or more, and is 1.5 or less.

From the viewpoint of low rolling resistance, it is preferable that the thickness Tbx of the cap rubber layer 2Gb measured on a normal line Nx which extends from a point Px to the tread outer surface 2S is at most 1.2 times, especially at most 1.1 times, the thickness Tb of the cap rubber layer 2Gb measured on the normal line N, in which the "point Px" is a point on the lateral base line X at a distance of 0.3 time the distance Lt from the axially outer end 7Be.

While a preferable embodiment of the present invention has been described with reference to the drawings, it goes without saying that the present invention is not limited to only such an embodiment and various changes and modifications may be made.

The present invention is more specifically described and explained by means of the following examples and comparative examples. It is to be understood that the present invention is not limited to these examples.

EXAMPLES 1 TO 3 AND COMPARATIVE EXAMPLES 1 TO 6

Heavy duty tires (size: 11R22.5) having the structure shown in FIG. 1 were manufactured based on the specifications shown in Table 1, and the performances described below were tested for each of the tires. These tires are the same excepting the thickness ratios regarding cap rubber layer, base rubber layer and sidewall rubber. Rubbers used in the cap rubber layer, the base rubber layer and the sidewall rubber are as follows:

Rubber used in cap rubber layer
    Loss tangent (tan δb): 0.08
    Hardness (Hsb): 66

Rubber used in base rubber layer
    Loss tangent (tan δa): 0.04
    Hardness (Hsa): 64

Rubber used in sidewall rubber
    Loss tangent (tan δs): 0.05
    Hardness (Hss): 54

(1) Rolling Resistance

The rolling resistance was measured using a rolling resistance tester under conditions of rim 7.50×22.5, inner pressure 700 kPa, tire load 24.52 kN and speed 80 km/h. The results are shown as an index based on the result of Example 1 regarded as 100. The smaller the value, the lower the rolling resistance and therefore the better the rolling characteristics.

(2) Cracking Resistance

A tire was run on a drum of a drum tester with radiating ozone under conditions of rim 7.50×22.5, inner pressure 700 kPa, tire load 36 kN and speed 40 km/h. The running time up to generation of cracks in the buttress face was measured.

(3) Durability

A tire was run on a drum of a drum tester under conditions of rim 7.50×22.5, inner pressure 700 kPa, tire load 36 kN and speed 20 km/h. The running time up to generation of damages in the tread portion was measured. The results are shown as an index based on the result of Example 1 regarded as 100. The larger the value, the better the durability.

(4) Wear Resistance

Tires were mounted on rims (size: 7.50×22.5), filled with air to an internal pressure of 700 kPa, and attached to a truck loaded so that the load per a tire was 24.5 kN, and the truck was run 200,000 km. The quantity of wear was obtained by measuring the depth of an axially innermost circumferential main groove and an axially outermost circumferential main groove. The average value of these groove depths was obtained and shown as an index based on that of Example 1 regarded as 100. The smaller the value, the better the wear resistance.

Test results are shown in Table 1.

TABLE 1

|  | Com. Ex. 1 | Com. Ex. 2 | Com. Ex. 3 | Com. Ex. 4 | Com. Ex. 5 | Com. Ex. 6 | Ex. 1 | Ex. 2 | Ex. 3 |
| --- | --- | --- | --- | --- | --- | --- | --- | --- | --- |
| La/Lt ratio | 0.5 | 0.85 | 0.85 | 0.7 | 0.7 | 0.5 | 0.7 | 0.65 | 0.75 |
| Lb/Lt ratio | 0.35 | 0.05 | 0.1 | 0.15 | 0.05 | 0.35 | 0.15 | 0.25 | 0.15 |
| Ls/Lt ratio | 0.15 | 0.1 | 0.05 | 0.15 | 0.25 | 0.15 | 0.15 | 0.1 | 0.1 |
| Ta/Tt ratio | 0.4 | 0.4 | 0.4 | 0.4 | 0.4 | 0.4 | 0.4 | 0.4 | 0.4 |
| Cb/Tb ratio | 1.3 | 1.3 | 1.3 | 1.7 | 1.3 | 0.9 | 1.3 | 1.3 | 1.3 |
| Test Results |  |  |  |  |  |  |  |  |  |
| Rolling resistance (index) | 105 | 95 | 95 | 105 | 100 | 95 | 100 | 102 | 98 |
| Cracking resistance (hour) | 350 | 300 | 200 | 350 | 350 | 350 | 350 | 350 | 350 |
| Durability (index) | 100 | 90 | 90 | 100 | 90 | 90 | 100 | 100 | 100 |
| Wear resistance (index) | 100 | 100 | 100 | 100 | 100 | 85 | 100 | 100 | 100 |

What is claimed is:

1. A heavy duty tire comprising:

a carcass that extends from a tread portion to each of bead cores of bead portions through sidewall portions;

a belt layer which comprises a plurality of belt plies including a widest belt ply having a maximum width and which is disposed radially outward of said carcass in said tread portion;

a pair of belt cushion rubbers having an approximately triangular cross section and a maximum thickness at a location corresponding to each of axially outer ends of said widest belt ply, each of said belt cushion rubbers having a Shore A hardness of 60 to 70, each of said belt cushion rubbers being interposed between said carcass and an axially outer end portion of said belt layer so as to have a gradually decreasing thickness as the belt cushion rubber extends from said axially outer end portion of said belt layer along a radially outer surface of said carcass, and a radial distance between the axially outer end of said widest belt ply and a radially inner end of the corresponding belt cushion rubber is from ⅓ to ¾ times a radial distance between the axially outer end of said widest belt ply and a location where the tire width reaches a maximum;

a pair of sidewall rubbers each disposed in each of said sidewall portions and having a radially outer end which extends radially outward beyond a lateral base line drawn in an axial direction of the tire from the axially outer end of said widest belt ply to cover the axially outer end of said tread rubber; and a tread rubber disposed radially outward of said belt layer in said tread portion, the tread rubber including:

a cap rubber layer which provides an outer surface of said tread portion; and a base rubber layer disposed radially inward of said cap rubber layer, wherein said cap and base rubber layers extend axially outward from a tire equator and said cap and base rubber layers are bent radially inward at said location corresponding to each of the axially outer ends of said widest belt ply to extend radially downward and to terminate in contact with a radially outer surface of said belt cushion rubber such that said cap rubber layer is located axially outward of said base rubber layer and only said cap rubber layer comes into contact with said sidewall rubber, a terminal end of a radially downwardly extending portion of the tread rubber is located radially inward of said lateral base line and is located radially outward of the radially inner end of said belt cushion rubber, a radially outer surface of said base rubber layer in a shoulder portion of the tire is approximately parallel to a radially outer surface of said tread portion, and an axially outer surface of said base rubber layer in the radially downwardly extending portion of the tread rubber is approximately parallel to the tire equator plane or is slightly inclined with respect to the tire equator plane, and said radially outer end of each of said sidewall rubbers terminates radially above a level of the axially extending radially outer surface of said base rubber layer in the shoulder portion, wherein, on said lateral base line, the La/Lt ratio of a thickness La of said base rubber layer to a distance Lt from the axially outer end of said belt ply having the maximum width to the outer surface of the tire is from 0.6 to 0.8, the Lb/Lt ratio of a thickness Lb of said cap rubber layer to said distance Lt is from 0.1 to 0.3, and the Ls/Lt ratio of a thickness Ls of said sidewall rubber to said distance Lt is from 0.1 to 0.2, on a normal line extending from the axially outer end of said belt ply having the maximum width to the tread outer surface, the Ta/Tt ratio of a thickness Ta of said base rubber layer to a distance Tt from the axially outer end of said belt ply having the maximum width to the tread outer surface is from 0.35 to 0.45, and the Cb/Tb ratio of a thickness Cb of said cap rubber layer in a tread center region, the center line of which is the equator of the tire and which has a width of 50% of the tread width, to a thickness Tb of said cap rubber layer on said normal line is more than 1.0 and less than 1.6.

2. The heavy duty tire of claim 1, wherein said base rubber layer has a loss tangent of 0.035 to 0.055, said cap rubber layer has a loss tangent of 0.070 to 0.090, and each sidewall rubber has a loss tangent of 0.045 to 0.090.

3. The heavy duty tire of claim 1, wherein said base rubber layer has a Shore A hardness of 62 to 66, said cap rubber layer has a Shore A hardness of 64 to 68, each sidewall rubber has a Shore A hardness of 52 to 56, and the hardness of said base rubber layer is larger than that of each sidewall rubber and is smaller than that of said cap rubber layer.

4. The heavy duty tire of claim 2, wherein said base rubber layer has a Shore A hardness of 62 to 66, said cap rubber layer has a Shore A hardness of 64 to 68, each sidewall rubber has a Shore A hardness of 52 to 56, and the hardness of said base rubber layer is larger than that of each sidewall rubber and is smaller than that of said cap rubber layer.

* * * * *